Dec. 1, 1936.  H. F. CONGABLE  2,062,779

SPRINKLER HEAD FOR IRRIGATION PIPES

Filed Nov. 16, 1935

INVENTOR
Henry F. Congable
BY Harry C. Schroeder
ATTORNEY

Patented Dec. 1, 1936

2,062,779

UNITED STATES PATENT OFFICE 2,062,779

SPRINKLER HEAD FOR IRRIGATION PIPES

Henry F. Congable, Oakland, Calif.

Application November 16, 1935, Serial No. 50,150

1 Claim. (Cl. 299—106)

This invention relates to outlets used in connection with irrigation pipes to distribute water therefrom.

It is an object of the invention to provide an outlet of the character described which will convert the water discharged therefrom into a spray so that the water may be distributed over a greater area of the soil.

Another object of the invention is to provide a combined sprinkler head and shut-off valve therefor.

Still another object of the invention is to provide means for distributing water from irrigation pipes without causing erosion of the soil adjacent the pipe thereby preventing the creation of pools which afford excellent breeding places for mosquitoes.

The invention possesses other objects and features of advantage, some of which together with the foregoing, will be specifically set forth in the detailed description of the invention hereunto annexed. It is to be understood that the invention is not to be limited to the particular form thereof shown and described as various embodiments thereof may be employed within the scope of the appended claim.

Referring to the drawing.

Figure 1:
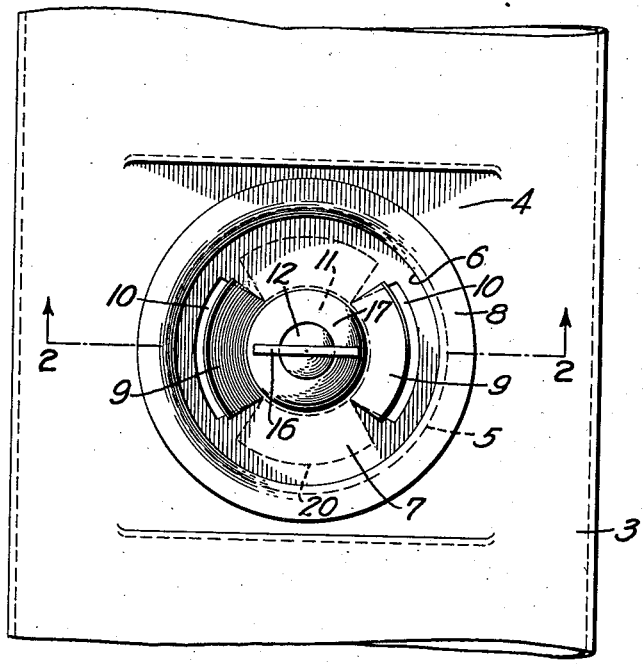
Figure 1 is a plan view showing the sprinkler head of my invention mounted on a section of irrigation pipe.

It is the usual practice, in irrigating large tracts of land, to provide main feeder pipes which conduct water from the source of supply to various points on the land from whence it may be distributed over the surface of the land by branch pipes, which system is at the present rapidly gaining in favor, or by the older method of distribution by means of surface trenches. In any event, the feeder pipes are provided, at spaced intervals therealong, with valves or gates by means of which the supply of water to any area of the land may be controlled. These outlet valves are usually positioned on the sides of the pipes and allow the water from the latter to discharge into the distribution trenches in a solid stream and with considerable force. Due to the force of such a concentrated stream, the ground immediately adjacent the outlets is frequently eroded, causing the formation of pools in which mosquitoes may breed. In addition to this, the force of the water will cause erosion of the trenches with the result that the sediment carried by the stream will possibly dam a trench and cause flooding of adjacent areas of the land. The most desirable feature of the trench distribution system of irrigation is that a large amount of water must be flowed onto the land in order to create the desirable degree of saturation thereof.

I have provided means whereby, instead of being flowed onto the land as has been done heretofore, the water is projected upwardly and outwardly from the top of the feeder pipes and is deposited on and over the entire surface of the land to be irrigated, in the form of a fine spray. This tends to more thoroughly and uniformly wet the ground and effects a material saving in water.

In detail, I provide the irrigation pipe 3 with a flattened portion 4 on the periphery thereof in which is formed an aperture 5. In this aperture is placed a cylindrical member having side walls 6, an end wall 7 and a peripheral flange 8. The flange 8 is disposed to contact the flattened portion 4 of the pipe about the aperture 5 and may be secured thereto in any suitable manner as by soldering, welding, or by means of bolts or screws. The end wall 7 is provided with a pair of tongues 9 struck out of the metal of the wall and bent upwardly so as to lie at an angle with the surface of the wall to provide orifices 10 therein.

When water under pressure is flowing in the pipe 3 it will be discharged at considerable velocity through the orifices 10, will contact the sloping under surface of each tongue 9 and be formed into a fan-shaped stream, which for the most part will be directed angularly against the vertical side wall 6. The inclination of the deflector members and the spacing of their edges with respect to the annular wall 6 are such that there will be a portion of the stream which will escape between the extreme end of the tongue and the rounded surface 18 at the junction of the side wall and the flange 8. This jet, indicated by the dot and dash line 19 of Figure 2 will be angularly met at the surface 18 by the flow of water reflected from the wall 6 after being directed thereagainst by the tongues 9, which union of the two streams will cause the water to be broken up into small globules and due to the velocity of the discharge, be projected upwardly and outwardly from the pipe in the shape of a conically shaped spray. The dimensions of the cone of water and the distance the drops of water will be deposited from the sprinkler head will of course be determined by the angular positioning of the tongues 9 and the pressure in the pipe 3.

Figure 2:
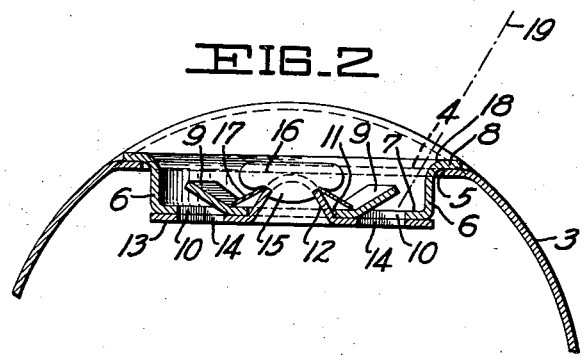
Figure 2 is a vertical sectional view. The plane of section is indicated by the line 2—2 of Figure 1.

Means are provided for closing the orifices 10 should it be desired to operate certain sprinkler heads in a pipe line to the exclusion of others therein. The end wall 7 is provided with a central aperture 11 in which is journaled a conically shaped protuberance 12 formed centrally of a valve plate 13 which latter is disposed on the surface of the end wall 7 facing the interior of the pipe. Formed at diametrically opposed points on the plate 13 are apertures 14 which are complemental to the orifices 10 as is shown in Figure 2. The top of the protuberance 12 is provided with a transverse slot which receives the shank 15 of a key 16, the shank being peened over against the sloping sides of the protuberance to securely hold the key in position. A resilient washer 17 is disposed between the key and the surface of the end wall so as to urge the valve plate into engagement with the opposite surface of the wall. It will be seen therefore that if the key 16 is turned through 90 degrees from the position in which it is shown in Figure 1, the apertures 14 of the valve plate will be moved to positions indicated by the dotted lines 20 whereupon the solid portions of the plate will assume positions over the orifices and close them.

From the foregoing description of my invention it will be seen that I have provided an improved construction for sprinklers for irrigating purposes; that I have provided a simple and efficient shut-off valve therefor, and that I have provided means whereby more complete and uniform wetting of land may be obtained with a minimum amount of water.

I claim:

A sprinkler head for irrigation pipes comprising a cup-like body having an annular wall provided with a back wall and also with a radially extended flange at its outer edge, said back wall having a central opening and a plurality of discharge openings, rigid deflector members carried by the rear wall and inclined outwardly in radial directions so as to overhang the respective discharge openings, the inclination of said deflector members and the spacing of their edges with respect to the annular wall being such that liquid issuing from said discharge openings will be directed by the deflector members against said annular wall, a valve plate having a centrally located hub having a slot in its outer end, said hub being projected outwardly through the central opening of said back wall, said valve plate also having openings adapted to register with the other openings of said back wall, a flat opening key secured in the slot of said hub, and means for maintaining a yieldable pressure upon the underside of the key to urge said valve plate into engagement with said back wall.

HENRY F. CONGABLE.